US009005355B2

(12) United States Patent
Foscante

(10) Patent No.: US 9,005,355 B2
(45) Date of Patent: *Apr. 14, 2015

(54) COATING COMPOSITIONS WITH ANTICORROSION PROPERTIES

(75) Inventor: Raymond E. Foscante, Yorba Linda, CA (US)

(73) Assignee: Bunge Amorphic Solutions LLC, White Plains, NY (US)

( * ) Notice: Subject to any disclaimer, the term of this patent is extended or adjusted under 35 U.S.C. 154(b) by 989 days.

This patent is subject to a terminal disclaimer.

(21) Appl. No.: 12/906,001

(22) Filed: Oct. 15, 2010

(65) Prior Publication Data

US 2012/0091397 A1 Apr. 19, 2012

(51) Int. Cl.
| C09K 15/02 | (2006.01) |
| C23F 11/18 | (2006.01) |
| C23F 11/173 | (2006.01) |
| C09D 5/08 | (2006.01) |
| C09D 7/12 | (2006.01) |

(52) U.S. Cl.
CPC .............. C09D 5/084 (2013.01); C09D 7/1266 (2013.01)

(58) Field of Classification Search
None
See application file for complete search history.

(56) References Cited

U.S. PATENT DOCUMENTS

| 1,654,404 A | 12/1927 | Blumenberg, Jr. |
| 2,222,196 A | 11/1940 | Vilkomerson |
| 2,222,199 A | 11/1940 | Fleck |
| 3,342,750 A * | 9/1967 | Kearby .......................... 502/208 |
| 3,394,987 A | 7/1968 | Lee et al. |
| 3,650,683 A | 3/1972 | Hloch et al. |
| 3,801,704 A | 4/1974 | Kobayashi et al. |
| 3,926,905 A | 12/1975 | Nose et al. |
| 3,943,231 A | 3/1976 | Wasel-Nielen et al. |
| 4,015,050 A | 3/1977 | Birchall et al. |
| 4,054,678 A | 10/1977 | Benjamin et al. |
| 4,076,221 A | 2/1978 | Groger |
| 4,078,028 A | 3/1978 | Kishi |
| 4,098,749 A | 7/1978 | Hoshino et al. |
| 4,111,884 A | 9/1978 | Takase et al. |
| 4,122,231 A | 10/1978 | Kishi |
| 4,127,157 A | 11/1978 | Gardikes et al. |
| 4,138,261 A | 2/1979 | Adrian et al. |
| 4,147,758 A | 4/1979 | Adrian et al. |
| 4,169,802 A | 10/1979 | Basile et al. |
| 4,171,984 A | 10/1979 | Hosaka et al. |
| 4,177,174 A * | 12/1979 | Hayashi et al. ................ 528/103 |
| 4,216,190 A | 8/1980 | Neely, Jr. |
| 4,227,932 A | 10/1980 | Leah et al. |
| 4,260,591 A | 4/1981 | Benjamin et al. |
| 4,319,926 A | 3/1982 | Nowakowski et al. |
| 4,321,244 A | 3/1982 | Magnier et al. |
| 4,328,033 A | 5/1982 | Boberski et al. |
| 4,329,327 A | 5/1982 | Neely, Jr. et al. |
| 4,333,914 A | 6/1982 | Neely, Jr. et al. |
| 4,364,854 A | 12/1982 | McDaniel et al. |
| 4,364,855 A | 12/1982 | McDaniel et al. |
| 4,375,496 A | 3/1983 | Nowakowski et al. |
| 4,383,866 A | 5/1983 | Nowakowski et al. |
| 4,395,387 A | 7/1983 | Goltz et al. |
| 4,418,048 A | 11/1983 | Dyer et al. |
| 4,435,219 A | 3/1984 | Greigger |
| 4,444,962 A | 4/1984 | McDaniel et al. |
| 4,444,965 A | 4/1984 | McDaniels et al. |
| 4,482,380 A | 11/1984 | Schlegel |
| 4,487,862 A | 12/1984 | Maruya |
| 4,505,954 A | 3/1985 | Hokamura et al. |
| 4,518,513 A | 5/1985 | Lochner et al. |
| 4,542,001 A | 9/1985 | Iino et al. |
| 4,547,479 A | 10/1985 | Johnson et al. |
| 4,567,152 A | 1/1986 | Pine |
| 4,597,796 A | 7/1986 | Ernst et al. |
| 4,622,371 A | 11/1986 | McDaniel |
| 4,629,717 A * | 12/1986 | Chao ............................. 502/208 |
| 4,640,964 A | 2/1987 | Johnson et al. |
| 4,673,663 A | 6/1987 | Magnier |

(Continued)

FOREIGN PATENT DOCUMENTS

| BR | 9104581 A | 4/1993 |
| BR | 9400746 A | 10/1995 |

(Continued)

OTHER PUBLICATIONS

International Preliminary Report on Patentability, completed on Jan. 11, 2013.

(Continued)

*Primary Examiner* — Joseph D Anthony
(74) *Attorney, Agent, or Firm* — Snell & Wilmer L.L.P.

(57) ABSTRACT

Anticorrosive coating compositions as disclosed comprise a binding polymer and an aluminum phosphate corrosion inhibiting pigment dispersed therein. The coating composition comprises up to 25 percent by weight aluminum phosphate. The binding polymer can include solvent-borne polymers, water-borne polymers, solventless polymers, and combinations thereof. The aluminum phosphate is made by sol gel process of combining an aluminum salt with phosphoric acid and a base material. Aluminum phosphate colloidal particles are nanometer sized, and aggregate to form substantially spherical particles. The coating composition provides a controlled delivery of phosphate anions of 100 to 1,500 ppm, depending on post-formation treatment of the aluminum phosphate, and has a total solubles content of less than 1500 ppm, The amorphous aluminum phosphate is free of alkali metals and alkaline earth metals, and has a water adsorption potential of up to about 25 percent by weight water when present in a cured film.

40 Claims, No Drawings

(56) References Cited

U.S. PATENT DOCUMENTS

| | | |
|---|---|---|
| 4,717,701 A | 1/1988 | McDaniel |
| 4,743,572 A | 5/1988 | Angevine et al. |
| 4,746,568 A | 5/1988 | Matsumoto et al. |
| 4,758,281 A | 7/1988 | Eckler et al. |
| 4,767,802 A | 8/1988 | Sakakibara et al. |
| 4,782,109 A | 11/1988 | DuLaney et al. |
| 4,876,097 A | 10/1989 | Autant et al. |
| 4,888,056 A | 12/1989 | van der Kolk et al. |
| 4,898,660 A | 2/1990 | Wilson et al. |
| 4,972,002 A | 11/1990 | Volkert |
| 4,990,217 A | 2/1991 | Philippot et al. |
| 4,996,103 A | 2/1991 | Henn et al. |
| 5,028,684 A | 7/1991 | Neuhaus et al. |
| 5,030,431 A | 7/1991 | Glemza |
| 5,077,332 A | 12/1991 | Blattler et al. |
| 5,096,933 A | 3/1992 | Volkert |
| 5,108,755 A | 4/1992 | Daniels et al. |
| 5,158,610 A | 10/1992 | Bittner |
| 5,183,656 A | 2/1993 | Uesaka et al. |
| 5,208,271 A | 5/1993 | Gallagher |
| 5,242,744 A | 9/1993 | Schryer |
| 5,256,253 A | 10/1993 | Zidovec et al. |
| 5,296,027 A | 3/1994 | Ernst et al. |
| 5,374,411 A | 12/1994 | Davis et al. |
| 5,403,519 A | 4/1995 | Rittler |
| 5,486,232 A | 1/1996 | Griffith et al. |
| 5,488,016 A | 1/1996 | Rittler |
| 5,496,529 A | 3/1996 | Fogel et al. |
| 5,534,130 A | 7/1996 | Sekhar |
| 5,545,678 A | 8/1996 | Giencke et al. |
| 5,552,361 A | 9/1996 | Rieser et al. |
| 5,698,758 A | 12/1997 | Rieser et al. |
| 5,707,442 A | 1/1998 | Fogel et al. |
| 5,763,015 A | 6/1998 | Hasui et al. |
| 5,783,510 A | 7/1998 | Kida et al. |
| 5,883,200 A | 3/1999 | Tsuchiya et al. |
| 6,002,513 A | 12/1999 | Goossen et al. |
| 6,010,563 A | 1/2000 | Taketani et al. |
| 6,022,513 A | 2/2000 | Pecoraro et al. |
| 6,117,373 A | 9/2000 | Kida et al. |
| 6,139,616 A | 10/2000 | Nagayama et al. |
| 6,177,489 B1 | 1/2001 | Okuse et al. |
| 6,316,532 B1 | 11/2001 | Nozaki et al. |
| 6,342,546 B1 | 1/2002 | Kato et al. |
| 6,409,951 B1 | 6/2002 | Inoue et al. |
| 6,447,741 B1 | 9/2002 | Chester et al. |
| 6,461,415 B1 | 10/2002 | Sambasivan et al. |
| 6,503,304 B2 | 1/2003 | Korn et al. |
| 6,547,870 B1 | 4/2003 | Griessmann et al. |
| 6,562,474 B1 | 5/2003 | Yoshimi et al. |
| 6,589,324 B2 | 7/2003 | Kamo et al. |
| 6,635,192 B1 | 10/2003 | Schwarz |
| 6,646,058 B1 | 11/2003 | Koger |
| 6,669,816 B1 | 12/2003 | Poch et al. |
| 6,677,053 B2 | 1/2004 | Yamaji et al. |
| 6,749,769 B2 | 6/2004 | Gai |
| 6,784,236 B2 | 8/2004 | Sugita et al. |
| 6,797,155 B1 | 9/2004 | Chester et al. |
| 6,838,506 B2 | 1/2005 | Nakao et al. |
| 6,881,782 B2 | 4/2005 | Crater et al. |
| 6,927,185 B2 | 8/2005 | Yamanaka et al. |
| 7,101,820 B2 | 9/2006 | Gai |
| 7,311,944 B2 | 12/2007 | Sambasivan et al. |
| 7,438,881 B2 * | 10/2008 | Staffel et al. ............... 423/311 |
| 7,481,877 B2 | 1/2009 | Gichuhi et al. |
| 7,678,465 B2 | 3/2010 | Sambasivan et al. |
| 7,682,700 B2 | 3/2010 | Sambasivan et al. |
| 7,763,359 B2 * | 7/2010 | Galembeck et al. ....... 428/472.3 |
| 2001/0031316 A1 | 10/2001 | Nozaki et al. |
| 2002/0031679 A1 | 3/2002 | Yano et al. |
| 2002/0040557 A1 | 4/2002 | Felton |
| 2002/0158230 A1 | 10/2002 | Bortnik |
| 2003/0113486 A1 | 6/2003 | Sakai et al. |
| 2003/0138673 A1 | 7/2003 | Sambasivan et al. |
| 2004/0011245 A1 | 1/2004 | Sambasivan et al. |
| 2004/0063815 A1 | 4/2004 | Kinose et al. |
| 2004/0071887 A1 | 4/2004 | Newton |
| 2004/0092637 A1 | 5/2004 | McClanahan |
| 2004/0138058 A1 | 7/2004 | Sambasivan et al. |
| 2004/0261909 A1 | 12/2004 | Hamada |
| 2005/0106384 A1 | 5/2005 | Sambasivan et al. |
| 2005/0158488 A1 * | 7/2005 | Oiwamoto et al. ......... 428/32.37 |
| 2006/0045831 A1 * | 3/2006 | Galembeck et al. .......... 423/311 |
| 2006/0057407 A1 | 3/2006 | Sambasivan et al. |
| 2006/0211798 A1 * | 9/2006 | Galembeck et al. .......... 524/414 |
| 2006/0246149 A1 | 11/2006 | Buchholz et al. |
| 2007/0215005 A1 | 9/2007 | Nicolai |
| 2008/0038556 A1 | 2/2008 | Galembeck et al. |
| 2008/0085965 A1 | 4/2008 | Imakita et al. |
| 2009/0064893 A1 | 3/2009 | Sambasivan et al. |
| 2009/0149317 A1 | 6/2009 | Stamires et al. |
| 2009/0217841 A1 | 9/2009 | Galembeck et al. |
| 2010/0179265 A1 * | 7/2010 | Galembeck et al. .......... 524/417 |
| 2010/0180801 A1 | 7/2010 | Thauern et al. |
| 2010/0203318 A1 | 8/2010 | Galembeck et al. |
| 2010/0292382 A1 * | 11/2010 | Galembeck et al. .......... 524/417 |
| 2012/0094128 A1 * | 4/2012 | Foscante ...................... 428/413 |
| 2013/0274372 A1 * | 10/2013 | Foscante ...................... 523/122 |
| 2013/0274400 A1 * | 10/2013 | Foscante et al. ............. 524/417 |

FOREIGN PATENT DOCUMENTS

| | | |
|---|---|---|
| BR | 9500522 A | 3/1997 |
| DE | 3233092 | 10/1983 |
| DE | 3233092 C1 | 10/1983 |
| EP | 0492137 | 7/1992 |
| EP | 492137 A2 | 7/1992 |
| EP | 492137 A3 | 10/1992 |
| EP | 0598464 A1 | 5/1994 |
| EP | 598464 A1 | 5/1994 |
| EP | 492137 B1 | 7/1996 |
| EP | 598464 B1 | 9/1996 |
| EP | 753546 A2 | 1/1997 |
| EP | 753546 A3 | 4/1997 |
| EP | 837031 A2 | 4/1998 |
| EP | 0837031 A2 | 4/1998 |
| EP | 1241131 A1 | 9/2002 |
| EP | 1241131 A1 | 9/2002 |
| EP | 1241131 B1 | 1/2006 |
| EP | 1807475 | 7/2007 |
| EP | 1807475 A2 | 7/2007 |
| EP | 1878700 A1 | 1/2008 |
| EP | 837031 A3 | 4/2008 |
| EP | 2066585 A1 | 6/2009 |
| FR | 2157866 A1 | 6/1973 |
| FR | 2157866 A1 | 6/1973 |
| FR | 2157866 B1 | 11/1975 |
| GB | 1379562 A | 1/1975 |
| GB | 1403242 A | 8/1975 |
| GB | 1403242 A | 8/1975 |
| GB | 2038791 A | 7/1980 |
| GB | 2038791 A | 7/1980 |
| GB | 2042573 A | 9/1980 |
| GB | 2038791 B | 12/1982 |
| GB | 2042573 B | 1/1983 |
| GB | 2221684 | 2/1990 |
| GB | 2221684 A | 2/1990 |
| GB | 0517258 | 10/2005 |
| JP | 53-19345 | 1/1978 |
| JP | 53019345 A | 2/1978 |
| JP | 53-59725 | 5/1978 |
| JP | 53059725 A | 5/1978 |
| JP | 55-160059 | 12/1980 |
| JP | 55160059 A | 12/1980 |
| JP | 56-32553 | 4/1981 |
| JP | 56-32554 | 4/1981 |
| JP | 56-32555 | 4/1981 |
| JP | 56-32556 | 4/1981 |
| JP | 56032553 A | 4/1981 |
| JP | 56032554 A | 4/1981 |
| JP | 56032555 A | 4/1981 |
| JP | 56032556 A | 4/1981 |
| JP | 56-131671 | 10/1981 |
| JP | 56131671 A | 10/1981 |

(56) References Cited

FOREIGN PATENT DOCUMENTS

| | | |
|---|---|---|
| JP | 57-158267 | 9/1982 |
| JP | 57158267 A | 9/1982 |
| JP | 60-215091 | 10/1985 |
| JP | 60215091 A | 10/1985 |
| JP | 61-101566 | 5/1986 |
| JP | 61101566 A | 5/1986 |
| JP | 61-286209 | 12/1986 |
| JP | 61286209 A | 12/1986 |
| JP | 62-4753 | 1/1987 |
| JP | 62004753 A | 1/1987 |
| JP | 63-101454 | 5/1988 |
| JP | 63101454 A | 5/1988 |
| JP | 1-110567 | 4/1989 |
| JP | 1110567 A | 4/1989 |
| JP | 1-167381 | 7/1989 |
| JP | 1167381 A | 7/1989 |
| JP | 1-234475 | 9/1989 |
| JP | 1234475 A | 9/1989 |
| JP | 1-249638 | 10/1989 |
| JP | 1249683 A | 10/1989 |
| JP | 4090874 A | 3/1992 |
| JP | 4-90874 | 3/1993 |
| JP | 6-179866 | 6/1994 |
| JP | 6179866 A | 6/1994 |
| JP | 6-286054 | 10/1994 |
| JP | 6286054 A | 10/1994 |
| JP | 7-241954 | 9/1995 |
| JP | 7241954 A | 9/1995 |
| JP | 7-330451 | 12/1995 |
| JP | 7330451 A | 12/1995 |
| JP | 8-72197 | 3/1996 |
| JP | 8072197 A | 3/1996 |
| JP | 8-268704 | 10/1996 |
| JP | 8-283619 | 10/1996 |
| JP | 8268704 A | 10/1996 |
| JP | 8283619 A | 10/1996 |
| JP | 10-139923 | 5/1998 |
| JP | 10139923 A | 5/1998 |
| JP | 10-213374 | 8/1998 |
| JP | 10-213374 A | 8/1998 |
| JP | 10-235782 | 9/1998 |
| JP | 10235782 A | 9/1998 |
| JP | 11-147261 | 2/1999 |
| JP | 11047261 A | 2/1999 |
| JP | 2001-189127 | 4/2001 |
| JP | 2001089127 A | 4/2001 |
| JP | 2001-329221 | 11/2001 |
| JP | 2001329221 A | 11/2001 |
| WO | 2006024959 A2 | 3/2006 |
| WO | WO-2006024959 A2 | 3/2006 |
| WO | 2006024959 A3 | 7/2006 |
| WO | 2007104465 A2 | 9/2007 |
| WO | 2007104465 A3 | 11/2007 |
| WO | 2008017135 A1 | 2/2008 |
| WO | 2009073112 A1 | 6/2009 |
| WO | 2009100510 A2 | 8/2009 |
| WO | 2009100510 A3 | 1/2010 |

OTHER PUBLICATIONS

International Search Report dated Jan. 12, 2012 for International PCT/US2011/056448 filed Oct. 14, 2011.
Non-Final Office Action U.S. Appl. No. 12/905,999 dated Jan. 2, 2013, total 87 pages.
Aluminum Triphosphate (k-White), Tayca Corporation (2009).
Non-Final office Action in U.S. Appl. No. 12/906,005 dated Mar. 19, 2013, total 63 pages.
Finntalc M15 Product Information brochure from Mondo Minerals B.V. (2013).
Beppu et al; Aluminum Phosphate Particles Containing Closed Pores: Preparation, Characterization, and Use as a White Pigment; Journal of Colloid and Interface Science; vol. 178; Article No. 0097; 1996; pp. 93-103, XP002368235; ISSN: 0043-9088.
Beppu et al; Self-Opacifying Aluminum Phosphate Particles for Paint Film Pigmentation; Journal of Coatings Technology; vol. 69, No. 867, Apr. 1997; pp. 81-88; XP009061770; ISSN: 0361-8773.
Burrell et al; Aluminium Phosphate Adjuvants Prepared by Precipitation at Constant pH. Part I: Composition and Structure, Vaccine 19 (2001) 275-281.
Burrell et al; Aluminium Phosphate Adjuvants Prepared by Precipitation at Constant pH. Part II: Physicochemical Properties, Vaccine 19 (2001) 282-287.
Faison et al.; Use of Polyphosphates as Deflocculants of Alumina; Ceramic Engineering & Science Proceedings; vol. 12[1-2]; 1991; pp. 106-115.
Filho et al; Genesis of a Solid Foam: Iron (III) Metaphosphate Transformation in Sol-Gel Crystallization Processes, Langmuir 1990, 6, pp. 1013-1016.
Lima et al; Non-Crystalline Aluminum Polyphosphates: Preparation and Properties, J. Braz. Chem. Soc.; vol. 7, No. 3; 1996; pp. 2009-2215.
Lima et al; Particles of Aluminum Metaphosphate Containing Closed Pores. Preparation, Characterization and Optical Properties, Colloids and Surfaces A: Physicochemical and Engineering Aspects, vol. 75; 1993; pp. 65-74.
Monteiro et al; Aluminum Polyphosphate Nanoparticles: Preparation, Particle Size Determination, and Microchemistry, Journal of Colloid and Interface Science; vol. 217, Article 10; 1999; pp. 237-248; jcis.1999.6381, http://www.idealibrary.com.
Rosseto et al.; Hydrous Non-Crystalline Phosphates: Structure, Function and a new White Pigment; J. Braz. Chem. Soc.; vol. 17, No. 8; Jun. 2006; pp. 1465-1472; XP002432072; ISSN: 0103-5053.
Souza et al; Formation of Opaque Films by Biomimetic Process, J. Mat. Sci.; vol. 32; 1997; pp. 2207-2213; XP002432073.
Souza et al; Improved Latex Film—Glass Adhesion Under Wet Environments by Using and Aluminum Polyphosphate Filler; 1998; pp. 358-377.
Yang et al; Experimental Observations of Water—Framework Interactions in a Hydrated Microporous Aluminum Phosphate, J. Phys. Chem. B.; vol. 109, 2005; pp. 4464-4469.
Beppu, M.M., Lima, E. C.O., and Galembeck, F., Aluminum Phosphate Particles Containing Closed Pores: Preparation, Characterization, and Use as a White Pigment, Journal of Colloid and Interface Science 178, 93-103 (1996), Article No. 0097.
Beppu, M. M., Lima, E. C. O., Sassaki, R.M., and Galembeck, F., Self-Opacifying Aluminum Phosphate Particles for Paint Film Pigmentation, Journal of Coatings Technology, vol. 69, No. 867, 81-88, Apr. 1997.
Lima, E. C. O., Beppu, M. M., Galembeck, F., Filho, J. F. V., and Soares, D. M., Non-Crystalline Aluminum Polyphosphates: Preparation and Properties, J. Braz, Chem. Soc., vol. 7, No. 3, 2009-215, 1996, printed in Brazil.
Souza, E. F., and Galembeck, F., Formation of Opaque Films by Biomimetic Process, Journal of Material Science 32 (1997) 2207-2213.
Souza, E.F., Silva, M. D. C., and Galembeck, F., Improved Latex Film—Glass Adhesion Under Wet Environments by Using and Aluminum Polyphosphate Filler, [publication], 358-377 (1998).
Lima, E. C. O., Beppu, M. M., and Galembeck, F., Nanosized Particles of Aluminum Polyphosphate, Langmuir, vol. 12, No. 7, pp. 1701-1703.
Monteiro, V. A. R., Souza, E. F., Azevedo, M. M. M., and Galembeck, F., Aluminum Polyphosphate Nanoparticles: Preparation, Particle Size Determination, and Microchemistry, Journal of Colloid and Interface Science 217, 237-248 (1999), Article ID jcis.1999.6381, http://www.idealibrary.com.
Burrell, L. S., Johnston, C.T., Schulze, D. Klein, J. White, J. L. and Hem, S. L., Aluminium Phosphate Adjuvants Prepared by Precipitation at Constant pH. Part I: Composition and Structure, Vaccine 19 (2001) 275-281.

(56) References Cited

OTHER PUBLICATIONS

Burrell, L. S., Johnston, C.T., Schulze, D. Klein, J. White, J. L. and Hem, S. L., Aluminium Phosphate Adjuvants Prepared by Precipitation at Constant pH. Part II: Physicochemical Properties, Vaccine 19 (2001) 282-287.

Yang, H., Walton, R. I., Biedasek, S., Antonijevic, S., and Wimperis, S., Experimental Observations of Water—Framework Interactions in a Hydrated Microporous Aluminum Phosphate, J. Phys. Chem. B. 2005, 109, 4464-4469.

Filho, P.P.A., and Galembeck, F., Genesis of a Solid Foam: Iron (III) Metaphosphate Transformation in Sol-Gel Crystallization Processes, Langmuir 1990, 6, 1013-1016.

Lima, E. C. O., and Galembeck, F., Particles of Aluminum Metalphosphate Containing Closed Pores. Preparation, Characterization and Optical Properties, Colloids and Surfaces A: Physicochemical and Engineering Aspects, 75 (1993) 65-74.

White Pigment prodn.—by mixing aq. Solns. Of metal phosphate, sodium phosphate and ammonium hydroxide, drying the ppte., milling, sievning and igniting: DERWENT; 1993; XP002368265; abstract.

Rosetto R. et al.; Hydrous non-crystalline phosphates: structure, function and a new white pigment; J. Braz. Chem. Soc., Sao Paulo, BR; vol. 17, No. 8; Jun. 2006; pp. 1465-1472; XP002432072; ISSN: 0103-5053.

International Search Report and the Written Opinion of the International Searching Authority, or the Declaration, Date of Mailing Jan. 12, 2012.

* cited by examiner

COATING COMPOSITIONS WITH ANTICORROSION PROPERTIES

FIELD OF THE INVENTION

This invention relates to coating compositions having anticorrosion properties and, more specifically, to coating compositions specially engineered to include an amorphous aluminum phosphate corrosion inhibiting pigment and methods for making the same.

BACKGROUND OF THE INVENTION

Coating compositions formulated to include one or more material to provide anticorrosion properties, used for forming a film layer on the surface of metallic substrates, are known in the art. Such coating compositions make use of materials known to provide some degree of protection against corrosion by one of three different mechanisms.

A first mechanism of corrosion control in coating compositions is one provided by a formulation where a binder composition, that imparts a high degree of moisture and water diffusion resistance to the resulting cured film, is combined with a pigment or solid component that enhances the barrier properties of the film composition, thereby providing a physical barrier to any water passing into the cured coating film to protect the underlying coated metal substrate surface from corrosion. Further, this coating film has a high degree of adhesion to the metallic substrate, primarily through the adhesion properties of the binder component of the composition. Pigment materials or solid components useful in facilitating the barrier properties of the composition comprising the film include aluminum, iron oxide, mica, talc, talc, calcium silicate, and barium sulfate in particle and/or flake form.

A second mechanism of corrosion control in coating compositions is one provided by the placement of a desired material adjacent the metallic substrate surface that is selected to sacrificially corrode upon contact with any water and oxygen passing into the cured coating film, thereby sacrificially corroding to cathodically protect and prevent the underlying metallic substrate from corroding. Zinc metal is an example material useful in this regard, and can be provided on the surface of the substrate as a constituent in a coating composition or can be provided separately therefrom.

A third mechanism of corrosion control is one where the coating composition makes use of a material that is corrosion inhibiting, e.g., a corrosion inhibiting pigment, in that such material, upon being contacted with water, releases a material that diffuses to the substrate surface and either adsorbs on the substrate to form an impermeable layer which interferes with the corrosion reaction, or forms a reaction product with the surface of the metallic substrate or with the oxide layer on the surface, thereby preventing the surface from reacting with water, oxygen, and other corrosive materials. This operates to passivate the substrate surface and thereby protect it from corrosion. Materials known to be useful in this regard include calcium zinc phosphomolybdate, aluminum triphosphate, zinc phosphate, zinc iron phosphate, strontium zinc phosphosilicate, calcium phosphosilicate, zinc aluminum phosphate, lead-containing materials, and chromate-containing materials.

While anticorrosion coating compositions known in the art provide some degree of protection against unwanted corrosion, such coating compositions may rely on the use of materials that present a danger/hazard to the environment and/or a health or safety hazard to people and for these reasons the use of such coating compositions have or are being restricted or prohibited altogether. Additionally, such known coating compositions, while providing some degree of corrosion protection, are unable to provide a desired or needed level of corrosion control that is sufficient to meet the demands of certain end-use applications. The shortcomings of such known coating compositions can be caused by a failure of the particular corrosion control mechanism to operate effectively under actual exposure conditions and/or a failure/breakdown in the film itself formed from the composition.

It is, therefore, desired that an anticorrosion coating composition be formulated in a manner that provides a desired degree of corrosion control/resistance without the use of materials being regulated or otherwise known to present a hazard/danger to the environment and/or health or safety issues to people. It is desired that such anticorrosion coating compositions be formulated in a manner that provides a desired improved degree of corrosion resistance and film performance properties when compared to known coating compositions, thereby meeting the needs of certain end-use applications. It is further desired that such anticorrosion coating composition be formulated from readily available materials, and/or be made according to a process, that facilitates manufacturing the coating composition in a manner that does not require the use of exotic equipment, that is not unduly labor intensive, and that is economically feasible.

SUMMARY OF THE INVENTION

Anticorrosive coating compositions as disclosed herein comprise a binding polymer and aluminum phosphate dispersed within the binding polymer. The binding polymer can be selected from the group including polyurethanes, polyesters, solvent-based epoxies, solventless epoxies, water-borne epoxies, epoxy copolymers, acrylics, acrylic copolymers, silicones, silicone copolymers, polysiloxanes, polysiloxane copolymers, alkyds and combinations thereof. The aluminum phosphate comprises amorphous aluminum phosphate. In a preferred embodiment, the aluminum phosphate is amorphous aluminum phosphate at the time that is it combined with the binding polymer and at the time that the coating composition is applied to a surface of a metallic substrate. The coating composition comprises in the range of from about 1 to 25 percent by weight aluminum phosphate.

In an example embodiment, the coating composition provides a controlled phosphate delivery, e.g., of phosphate anions, in the range of from about 100 to 1,500 ppm. The phosphate delivery can come from the presence of amorphous aluminum phosphate alone or as combined with ammonium phosphate. In an example embodiment, the coating composition has total solubles content of less than about 1500 ppm, less than 800 ppm, preferably less than about 400 ppm, and more preferably of from about 100 to 250 ppm. The amorphous aluminum phosphate is preferably substantially free of alkali metals and alkaline earth metals. Additionally, the aluminum phosphate has a water adsorption potential of up to about 25 percent by weight water when present in a cured film.

The amorphous aluminum phosphate particles are aggregates of colloidal primary particles, wherein the primary particles have an average size of about 1 to 100 nanometers. Both the colloidal and aggregate particles are substantially spherical in shape, and have a substantially uniform size distribution.

Amorphous aluminum phosphate useful for forming anticorrosion coating compositions is formed by sol gel process wherein an aluminum salt is combined with phosphoric acid in an aqueous solution. A sufficient amount of base material is added to increase the pH of the solution to form a sol comprising a dispersion of colloidal amorphous aluminum phosphate particles in solution. A further amount of the base material is added to cause the colloidal particles to aggregate and form a gel structure, wherein the gel comprises a three-dimensional structure of linked-together amorphous aluminum phosphate particles. In an example embodiment, the process of making the aluminum phosphate is specifically controlled to produce amorphous aluminum phosphate having the desired engineered properties of controlled phosphate anion release with a reduced/low solubles content.

The resulting amorphous aluminum phosphate is dried and/or thermally treated, depending on the specific end-use applications. In one embodiment, the amorphous aluminum phosphate is washed and dried at temperatures sufficient to only evaporate water, producing a resulting powder that (when joined with a binding polymer) produces an anticorrosion coating composition having a relatively high phosphate anion controlled release of up to 1,500 ppm due in part to the presence of ammonium phosphate. In another embodiment, the amorphous aluminum phosphate washed and thermally treated at temperatures between 200 and 300° C., producing a resulting powder that (when joined with a binding polymer) produces an anticorrosion coating composition having a lower phosphate anion controlled release due to the absence of ammonium phosphate.

Such anticorrosion coating compositions can be used as a primer coat, a mid-coat, and/or a top-coat coating depending on the particular formulation and/or end use application. The anticorrosion coating composition can be applied to a metal substrate and allowed to dry to form fully-cured film. In the event that the binding polymer is solvent-borne, the amorphous aluminum phosphate in the cured film controls corrosion of the underlying substrate by both adsorbing and/or absorbing water entering the film and providing passivating phosphate anion.

Anticorrosion coating compositions as disclosed herein are formulated in a manner that provides a desired degree of corrosion control/resistance without the use of materials being regulated or otherwise known to present a hazard/danger to the environment and/or health or safety issues to people. Further, such anticorrosion coating compositions are formulated in a manner that provides a desired improved degree of corrosion resistance, when compared to known coating compositions, thereby meeting the needs of certain end-use applications. Such anticorrosion coating compositions are formulated from readily available materials, and are made by processes, that facilitate manufacturing in a manner that does not require the use of exotic equipment, that is not unduly labor intensive, and that is economically feasible.

DETAILED DESCRIPTION

Anticorrosion coating compositions, and methods for making the same, are disclosed herein. Such anticorrosion coating compositions are formulated to include a desired amount of an amorphous aluminum phosphate corrosion inhibiting pigment that has been specially engineered to provide combined desired features of a controlled release/delivery of an optimum amount of passivating anion, e.g., phosphate anion, to inhibit corrosion, and a controlled amount of total solubles. Further, the corrosion control properties of said engineered aluminum phosphate compositions are facilitated by the ability of the amorphous structure to increase the barrier properties of the composition by adsorbing diffusing water in the film and/or by chemically bonding with functional groups of certain binders to increase the cross-link density, and hence barrier properties, of the film. These features arise from the unique properties of the particles formed as a result of the sol-gel synthesis process that is used to make the aluminum phosphate.

Together, such features permit anticorrosion coating compositions as disclosed herein to provide an improved degree of corrosion resistance to an underlying metallic substrate surface without compromising film and composite integrity and stability, thereby offering such improved corrosion resistance for an extended service life when compared to conventional anticorrosion coating compositions. Conventional anticorrosion coating compositions neither provide an adequate controlled release rate of passivating anion nor have a controlled amount of total solubles.

Amorphous aluminum phosphates used in these anticorrosion coating compositions are also specially designed to have a high level of compatibility with a variety of different binding polymers or binding polymer systems useful for forming such coating composition, thereby providing a high degree of flexibility and choice in formulating the anticorrosion coating composition to meet the needs and conditions of a variety of end-use applications in a number of different end-use industries. Current commercially available inhibitive pigments are very often either binder specific or substrate specific in their application, thereby limiting end-use applications.

Anticorrosion coating compositions comprise a desired binding polymer that can be selected depending on the different end-use application as well as other factors. Example binding polymers include those currently used for making known anticorrosion coating compositions, and can be selected from the general group including water-borne polymers, solvent-borne polymers, hybrids and combinations thereof. Example water-borne polymers useful for making anticorrosion coating compositions include acrylic and acrylic copolymers, alkyd, epoxy, polyurethane, and silicone, and polysiloxane polymers. Example solvent-borne and/or non-aqueous polymers useful for making anticorrosion coating compositions include acrylic and acrylic copolymers, epoxy, polyurethane, silicone, polysiloxane, polyester, and alkyd. Preferred binding polymers include acrylic copolymer latex, alkyd, polyurethane and epoxy polymers.

In an example embodiment, anticorrosion coating compositions comprise in the range of from about 15 to 75 weight percent, preferably in the range of from about 20 to 60 weight percent, and more preferably in the range of from about 20 to 35 weight percent of the binding polymer based on the total weight of the coating composition. An anticorrosion coating composition comprising less than about 15 percent by weight of the binding polymer may include a greater amount of the corrosion inhibiting pigment than necessary to provide a desired degree of corrosion resistance. An anticorrosion coating composition comprising greater that about 75 percent by weight of the binding polymer may include an amount of the corrosion inhibiting pigment that is insufficient to provide a desired degree of corrosion resistance. While certain amounts of the binding polymer have been provided, it is to be understood that the exact amount of the binding polymer that is used to formulate anticorrosion coating compositions will vary depending on such factors as the type of binding polymer used, the type and/or quantity of inhibiting pigment that is used, and/or the particular end-use application, e.g., the substrate to be coated and the corrosive environment intended for the substrate.

Corrosion inhibiting pigments useful for making anticorrosion coating compositions comprises phosphate-containing compounds. Preferred phosphate-containing compounds are aluminum phosphates. Aluminum phosphates useful in this regard include amorphous aluminum phosphates, crystalline aluminum phosphate, and combinations thereof. Preferred aluminum phosphates are amorphous aluminum phosphates, and most preferred aluminum phosphates are amorphous aluminum orthophosphates. The use of amorphous aluminum phosphates is preferred because amorphous aluminum phosphates, as specially engineered herein, provide a controlled release rate of phosphate anion, when diffusing water contacts the pigment in the coating, sufficient to provide passivation to the metal substrate.

Further, it has been found that amorphous aluminum phosphate compositions can be engineered having a soluble material content that is sufficiently low such that total solubles do not cause osmotic blistering of a cured film when such film is contacted with water. Accordingly, amorphous aluminum phosphates as used in anticorrosion coating compositions as disclosed herein are specially engineered to provide both a controlled release or delivery of passivating anion, e.g., phosphate anions, to inhibit corrosion, and to have a low total solubles content to avoid osmotic blistering to ensure extended film integrity.

In an example embodiment, the amorphous aluminum orthophosphates are amorphous aluminum hydroxy phosphates. Amorphous aluminum hydroxy phosphates are preferred because they provide uniform dispersion properties within the composition and the dispersion remains stable throughout the shelf-life of the formulation. The hydroxyl content of the amorphous aluminum hydroxy phosphate is the unique functional group that provides matrix stability by providing hydrogen bonds with suitable groups of the binding polymer of the formulation, e.g., such as carboxyl groups, amino groups, hydroxyl groups, acid groups and the like. This feature is unique to the amorphous aluminum hydroxy phosphate and is not present in crystalline aluminum phosphates.

Anticorrosion coating compositions are formulated to contain a specific amount of the inhibiting pigment calculated to provide a sufficient amount of the passivating anion when placed into end use to inhibit corrosion. In an example embodiment, the anticorrosion coating composition comprises in the range of from about 3 to 25 weight percent, preferably in the range of from about 5 to 15 weight percent, and more preferably in the range of from about 8 to 12 weight percent of the amorphous aluminum phosphate based on the total weight of the coating composition dry film. An anticorrosion coating composition comprising less than about 3 percent by weight of the amorphous aluminum phosphate may contain an amount that is insufficient to provide a desired degree of corrosion resistance. An anticorrosion coating composition comprising greater that about 25 percent by weight of the amorphous aluminum phosphate may include an amount more than necessary to provide a desired degree of corrosion resistance, and such additional amount can operate to impair long-term stability and/or integrity of the cured coating film. While certain amounts of the amorphous aluminum phosphate have been provided, it is to be understood that the exact amount of the amorphous aluminum phosphate that is used to formulate anticorrosion coating compositions will vary depending on such factors as the type and/or quantity of binding polymer used, and/or the particular end-use application, e.g., the substrate to be coated and the corrosive environment intended for the substrate As briefly noted above, the amorphous aluminum phosphate is specially engineered to provide a controlled release or delivery of one or more passivating anions upon being contacted with water and oxygen, when the coating composition is applied to the surface of a metallic substrate, formed into a cured film, and placed into a corrosive environment. Over time, water/moisture and certain corrosive salts migrate or diffuse into the applied coating film, which water comes into contact with the phosphate component that is available in the film. Such contact with water promotes release/delivery of phosphate anion from the amorphous aluminum phosphate in a controlled manner. These phosphate anions react with iron species of the surface of the underlying metallic substrate to form a passivating film thereon that operates to form a barrier protecting the underlying metallic surface from corrosion. A feature of the amorphous aluminum phosphates used to make anticorrosion coating compositions disclosed herein is that they are engineered to release/deliver a controlled amount of the phosphate anions. Specifically, to release/deliver an amount of the phosphate anions calculated to provide an optimum level of corrosion protection without sacrificing other coating cured-film performance properties that may otherwise compromise the effective film service life.

Currently phosphate-based inhibitive pigments are derived in some fashion from zinc phosphate. The latter material has the disadvantage of a low release rate, and the release rate is dependent on conditions existing in the service environment. To accommodate this deficiency, zinc phosphate has been modified with other components such as aluminum, strontium, calcium to facilitate phosphate release properties and to provide secondary or companion passivation mechanisms, typically providing a component that precipitates onto the substrate to provide cathodic passivation. These approaches provide some benefit by improving performance compared to zinc phosphate, but they do not reach the desired level of improvement described above. The amorphous aluminum phosphate compounds described herein optimize the anodic passivation mechanism in a manner not achieved by any other phosphate-based pigment.

In an example embodiment, anticorrosion coating compositions as disclosed herein comprising amorphous aluminum phosphate are engineered to release a controlled amount of passivating phosphate anion when present in a cured film placed into an end-use application that is exposed to moisture. The controlled amount can vary depending on such factors as the method that is used to make the aluminum phosphate, the binding polymer system, and the particular end-use application. In an example embodiment, coating compositions can be engineered to provide a relatively high controlled phosphate anion release of 1,500 ppm or less, preferably between about 600 to 1,200 ppm, and more preferably between about 800 to 1,000 ppm. Such high level of controlled phosphate anion release can be useful in coating systems comprising a solvent-borne binding polymer such as epoxy and the like with low moisture vapor transmission rates (MVT), that are not as susceptible to suffering film breakdown due to relatively high solubles levels. The ability to provide a coating composition having such a high level of controlled phosphate anion release is desirable for end-use applications placed into aggressive corrosion environments where high levels of passivating anion may be required to protect against corrosion where physical breaks or voids occur in the coating film.

In another example embodiment, coating compositions can be engineered to provide a controlled phosphate anion release of 500 ppm or less, preferably between about 50 to 500 ppm, more preferably between about 100 to 200 ppm. Such level of controlled phosphate anion release can be useful in coating systems comprising a water-borne binding polymer such as latex and the like with higher MVT, that can be more susceptible to suffering film breakdown due to relatively high total solubles levels. The ability to provide a coating composition having such level of controlled phosphate anion release is desirable for end-use applications placed into less aggressive corrosion environments.

The amount of passivating anion to be delivered depends on a number of different factors such as the loading or amount of the amorphous aluminum phosphate used to make the anticorrosion composition, the type of binding polymer that is used, the type of metallic substrate being protected, and the type of corrosion environment present in the end-use application. In one example embodiment, where the metallic substrate being protected comprises iron and the corrosion environment comprises water, oxygen, and other corrosive salts, the amorphous aluminum phosphate is engineered to release approximately 160 ppm of the passivating phosphate anion.

An amorphous aluminum phosphate having a controlled release less than about 50 ppm of the passivating anion may not provide a sufficient amount of the passivating anion to inhibit corrosion for the desired service life. An amorphous aluminum phosphate having a controlled release greater than about 1,500 ppm of the passivating anion, while providing a level sufficient to inhibit corrosion, may provide too high a level of total solubles that can cause blistering or other unwanted effects in the cured film that can impair its long term integrity and stability, thereby possibly reducing effective service life.

Anticorrosion coating compositions are engineered having a controlled or minimized level of solubles. As used herein, the term "solubles" and "nonpassivating solubles" are used interchangeably to refer to materials usually produced as a byproduct of making the amorphous aluminum phosphate and can include alkali metals such as sodium, potassium, and lithium, and such anions as sulfates, chlorides and nitrates, and is understood to not include the passivating anions, present in the amorphous aluminum phosphate. In a preferred embodiment, the amount of nonpassivating solubles is zero. A maximum amount of nonpassivating solubles is 250 ppm.

It has been discovered that the presence of such solubles, if left unchecked, can operate to impair the stability and/or integrity of the anticorrosion coating composition and/or the cured film formed therefrom, thereby adversely affecting its intended service life. For example, the presence of such solubles has been found to result in unwanted blistering, delamination from the substrate, under-film corrosion and other types of unwanted film failures when exposed to certain corrosive environments, which film failures operate to expose the underlying metallic substrate surface leaving it unprotected.

In an example embodiment, it is desired that the anticorrosion coating composition comprise less than about one percent (or less than 10,000 ppm) of total solubles, i.e., solubles including phosphate passivating anion, preferably less than about 1,500 ppm total solubles, and more preferably less than about 400 ppm total solubles. In an example embodiment, the anticorrosion coating composition comprises in the range of from about 50 to 800 ppm total solubles, and preferably in the range of from about 100 to 250 ppm total solubles. Anticorrosion coating compositions comprising less than about 400 ppm total solubles produce cured films that, when subjected to end use corrosive environments, do not demonstrate blistering or other unwanted film events, thereby operating to enhance effective service life. Accordingly, a feature of anticorrosion coating compositions is that, in addition to providing a controlled release of passivating anion, they are specially engineered to have a reduced amount of total solubles to ensure an intended service life.

A feature of this invention derived from the ability to provide aluminum phosphate inhibitive pigments with controlled release and suitable soluble levels, is the ability to formulate coating compositions with phosphate release rates tailored for specific applications. For example, it has been found that epoxy-polyamide based coating compositions can accommodate higher levels of total solubles than an acrylic latex composition. This has been found to be especially beneficial in providing improved protection against corrosion at edges, defects, and physical breaks in the coating film. Having higher levels of phosphate available in these circumstances facilitates anodic passivation and protects wet adhesion.

Aluminum phosphates useful in anticorrosion coating compositions as disclosed herein are specifically engineered to have uniformly spherical shapes, to have nanosized ($10^{-3}\mu$ or 100 nanometers) primary particles with high surface area and micro-porosity, and to have a narrow/substantially uniform particle distribution when aggregated. The uniformity in shape and size is desired for the purpose of facilitating mixing and uniform dispersion of the aluminum phosphate particles in the binding polymer, thereby promoting uniform corrosion resistance performance of the coating composition and cured film formed therefrom. In an example embodiment, the spherical shape of the aggregate particles is obtained by using a sol-gel synthesis method as disclosed herein, and by controlling certain processing steps in the method of making the aluminum phosphate, e.g., by specifically avoiding shear agitation which can produce undesired aluminum phosphate plate or sheet-shaped particles.

The dried aluminum phosphate particles have a substantially uniform primary particle size distribution of between about 10 to 100 nanometers, wherein D99 is approximately 100 nanometers, and D50 is approximately 50 nanometers. The particle size distribution of aggregated primary particles after milling ranges from about D99 of 6μ to D50 of 2μ. Producing aluminum phosphate particles having a substantially uniform particle size distribution is desired to promote uniform particle dispersion in the binding polymer to produce uniform corrosion performance within the coating composition.

Aluminum phosphate useful in anticorrosion coating compositions as disclosed herein are specifically engineered to having relatively high surface areas that can be characterized by a variety of methods including BET measurement ($m^2$/gram) and mercury porosimetry. In an example embodiment, the aluminum phosphate has a surface area of greater than about 100 $m^2$/g, preferably between about 125 $m^2$/g to 150 $m^2$/g, and more preferably between about 125 $m^2$/g to 135 $m^2$/g. The surface area of the aluminum phosphate is controlled by the sol-gel synthesis reaction and by the particular process that is used to treat the aluminum phosphate solid after formation by the sol gel process, which process and treatment is better described below.

Sol Gel Method of Making

Generally, the amorphous aluminum phosphate is a phosphate complex in which the nucleating cation is aluminum alone, or aluminum in combination with other multi-valent cations such as calcium, magnesium, barium and the like. It is desired that a method of making the amorphous aluminum phosphate be one that produces amorphous aluminum phosphate free of all other metal cations, e.g., especially free of alkali metal cations, for the purpose of reducing/eliminating the existence of unwanted solubles in the resulting anticorrosive coating composition.

In an example embodiment, the amorphous aluminum phosphate is prepared by a sol-gel process that involves the creation of inorganic molecular networks from molecular or ionic precursors through the formation of a colloidal suspension (sol) and the gelation of such sol to form a solid network in a continuous liquid phase (gel). The precursors for synthesizing these colloids typically comprise a metal or metalloid element surrounded by various reactive groups. Stated another way, in the sol gel process, simple molecular or ionic precursors are converted into nano-sized particles to form a colloidal suspension (sol). The colloidal nano-particles are then linked with one another in a three-dimensional liquid filled solid network (gel). This transformation to a gel can be initiated in a number of ways, but the most convenient approach is to change the pH of the reaction solution.

The method used to remove the liquid from the solid will affect the sol gel's properties. For example, supercritical drying will maintain the three-dimensional structure in the dried solid, whereas slow drying in a fluid evaporation process collapses the network structure creating a high density material.

Advantages to preparing the amorphous aluminum phosphate via a sol gel synthesis process, as opposed to, for example, a precipitation process, include process versatility and simplicity resulting in the possibility to obtain highly pure and/or tailored materials, uniform particle size distribution, substantially spherical-shaped aggregate particles, nano-sized particles, and custom engineered compositions. While amorphous aluminum phosphate as disclosed herein comprises substantially spherical aggregate particles, it is understood that some small amount of nonspherical particles may unintentionally be produced and may be present in the resulting anticorrosion coating compositions. For example, the sol gel process provides alkali-metal free amorphous aluminum phosphate of high surface area which provides an optimum amount of phosphate anion when the material is contacted with water to provide passivation to steel thereby preventing corrosion.

As used herein, the term "gel" is understood to be a three-dimensional cage structure formed of linked large molecular mass polymers or aggregates in which liquid is trapped. The network of the structure typically consists of weak and/or reversible bonds between the core particles. The term "sol" as used herein is understood to be a colloidal dispersion of solids in a liquid. The solids comprise aluminum phosphate having nanometer scale average particle sizes. The gel comprises an aluminum phosphate sol as a dispersed phase in a semi-rigid mass enclosing all of the liquid. Post treatment of product produced by the sol gel process by filtration, washing, drying, and combinations thereof leads to aggregation of the colloidal solids in a controlled fashion to form a larger solid complex.

Generally, the sol gel process includes the following process steps: (1) nucleation or polymerization or condensation of the molecular precursors to form primary particles, e.g., nanometer in scale, to form the sol (colloidal dispersion or suspension); (2) growth of the particles or gelation; (3) linkage of the particles to form chains and the extension of such chains throughout the liquid medium to form a thickened gel; and (4) treating the sol gel material to remove the liquid to give a desired solid end-product.

In an example embodiment, the precursor solution is prepared by combining a suitable aluminum source, with a phosphorous source. Suitable aluminum sources can be selected from the group of aluminum salts such as aluminum chloride, aluminum nitrate, aluminum sulfate and the like. A preferred aluminum source is aluminum nitrate. Phosphorous sources useful for forming amorphous aluminum phosphate by sol gel process include phosphoric acid, and salts of phosphorus as orthophosphates or as polyphosphates. A source of phosphorus is fertilizer grade phosphoric acid, from any origin, that has been clarified and discolored.

The primary ingredients of the precursor solution are combined together in an aqueous environment with a gelling agent to produce a colloidal dispersion of solid aluminum phosphate particles in solution. In an example embodiment, the precursor solution is formed by combining aluminum nitrate with phosphoric acid (85% by weight) in the presence of water. Water can be present in one or more of the aluminum nitrate, the phosphoric acid, or as added water independent of either ingredient.

After the precursor ingredients are combined, the resulting system is stirred and a suitable alkaline ingredient is added to the stirred solution. Alkaline ingredients useful for this purpose include those conventionally used to change the pH of the system, e.g., increase the pH of the acidic system, and in an example embodiment is ammonium hydroxide. In a preferred embodiment, it is desired that the alkaline solution be alkali metal fee. The presence of the ammonium hydroxide increases the pH and drives the process of nucleation and condensation forming a colloidal dispersion or sol. Depending on the concentration of nucleating agent, this step can be intermediate or final. Further addition of nucleating agent causes the primary aluminum phosphate particles to link together forming a gel, e.g., results in gelation, and further results in the colloidal particles being linked into the gel structure to form a sol gel.

In an example embodiment, it may be desired to control the sol gel process to isolate the colloidal dispersion before gelation. This can be done by controlling the reaction conditions so that only colloidal dispersion occurs (i.e., formation of a sol) and not full gelation. Controlling the process in this manner may provide certain manufacturing advantages and/or provide certain advantages relating to handling of the end-product. The colloidal dispersion from this process can be filtered to recover the solids, and then thermally treated and/or washed as described below.

In an example embodiment, the phosphoric acid, aluminum nitrate, and/or ammonium hydroxide can be heated prior to being combined with one another, or can be heated after combination, e.g., during stirring. Additionally, the amount of water present and/or the rate of addition of the ammonium hydroxide, can be adjusted to produce a desired reaction product having a desired yield of amorphous aluminum phosphate.

In an example embodiment that amount of ammonium hydroxide, $NH_4OH$, that is added to the acid solution is sufficient to neutralize the acid system to initiate formation of colloidal aluminum phosphate particles, and for gelation exceeds the stoichiometric amount to form ammonium nitrate, $NH_4NO_3$. The range can be from the stoichiometric amount of $NH_4OH$ needed to form the $NH_4NO_3$ (1.0 stoichiometry) to about 3.0 stoichiometry, preferably between about 1.1 and 2.0, and more preferably between about 1.2 and 1.5.

The order of addition (i.e., base solution to acid precursor solution or vice versa) has been found to control the rate and extent of gelation. When base is added to stirred precursor solution in stoichiometric concentration ranges stated above (1.0 to 3.0) virtually instantaneous gelation occurs. It has been discovered that reversing the order of addition, i.e., adding the precursor solution to the base solution, provides control over the extent of growth from colloidal dispersion to full gelation. As discussed below, it has also been discovered that particle morphology can be controlled by the method of addition.

It has been found that concentrations of ammonia in excess of the 1.1 stoichiometric ratio are useful to minimize unreacted aluminum in the resulting complex. For the end-use application as an inhibitive pigment, it is desirable that the phosphate release rate from the complex when contacted with water be in the 200 to 400 ppm range. Testing has determined that phosphate anion elution is in the target range when the ammonia level in the reaction is around 1.2 to 3.0 stoichiometric ratio and after the solid has been thoroughly washed and/or thermally treated to remove the soluble by-products as described below.

In an example process, the sol gel is next subjected to post gelation treatment which may comprise heating, washing, and/or sizing. In an example embodiment, the sol gel powder formed is isolated by collapsing the dispersion or gel by driving off the liquid constituent. Various types of gels can be formed from the sol gel such as; xerogels that are solids formed by unhindered drying of the sol gel so as to yield high porosity and surface area (150-1,000 m$^2$/g) in solid form, aerogels that are solids formed by supercritical drying (e.g., freeze drying), hydrogels that are water insoluble colloidal polymer particles dispersed in water, and organogels that are amorphous, non-glassy solids comprising a liquid organic phase trapped in the solid matrix.

The sol gel consists of solid $AlPO_4$ connected through various pH dependent (amino, water, phosphate) linkages to form a solid dispersed phase as a mass enveloping all the liquid, the latter consisting of water and dissolved salts. Heating the gel, to a temperature above about 100° C., evaporates the water and any ammonia and collapses the mass to a solid consisting of aluminum phosphate, $AlPO_4$, and ammonium nitrate, $NH_4NO_3$. Heating the gel or the collapsed gel solid, to a temperature above about 215° C., thermally decomposes the ammonium nitrate, $NH_4NO_3$, thereby eliminating it from the powder product. Heating to temperatures above about 215° C. leads to a decrease in pH, indicating that residual amino groups remaining after thermal decomposition of the ammonium nitrate, $NH_4NO_3$, most likely as substituents on the PO group, are also thermally decomposed and replaced by hydrogen atoms thereby making the complex acidic. The solid product resulting from this treatment has been shown by analysis to be pure amorphous aluminum phosphate having a phosphate release rate of around 240 ppm and surface area greater than 125 m$^2$/gram.

Accordingly, the post gelation heat treatment can comprise a single step of heating the sol gel to a relatively high temperature above about 250° C. for a period of time sufficient to achieve water evaporation, collapsing of the mass, and thermally decomposing the ammonium nitrate, $NH_4NO_3$. In an example embodiment, this can be done at about 250° C. for approximately 12 to 72 hours. The resulting product from this heat treatment is substantially aluminum phosphate, i.e., there is very little if any ammonium phosphate or ammonium nitrate. Accordingly, the controlled phosphate anion release for aluminum phosphate treated in this manner is 250 ppm or less as noted above.

Alternatively, the post gelation heat treatment can comprise a single step of heating the sol gel at a lower temperature of about above about 100 to 150° C. for a period of time sufficient to achieve water evaporation. In an example embodiment, this can be done at about 110° C. for approximately 1 to 24 hours. The resulting product from this heating or drying treatment is aluminum phosphate and ammonium phosphate and ammonium nitrate. The amount of ammonium phosphate present in the resulting product is up to about 1,000 ppm.

This drying step can be followed by a heat treatment step at a temperature of between about 215 to 300° C. In a preferred embodiment, the drying step is at about 110° C. for about 24 hours, and the heat treatment is about 250° C. for up to 1 to 3 days (16 to 72 hours). The resulting solid has a moisture content of from about 5 to 20 percent by weight. The pH of the heat treated material can be adjusted by re-dispersing the complex and adjusting the pH with ammonium hydroxide solution. The resulting complex is then dried at 100 to 110° C. to remove water and ammonia.

If desired, before drying or heat treatment, the sol gel material can be filtered to separate the solid particles from solution, and the separated solid, e.g., in the form of a cake, can be subjected to one or more wash cycles. The wash cycles use water and operate to rid the solid aluminum phosphate particles of any unwanted solubles, e.g., ammonium compounds such as ammonium nitrate, and ammonium phosphate that have been formed as a reaction by-product. The washing step removes free ammonium salts, however, ammonium phosphate bonded to the aluminum phosphate survives. The washed sample can then be dried and/or heat treated in the manner disclosed above to further evaporate water and/or thermally decompose any residual ammonium nitrate and ammonium phosphate in the washed aluminum phosphate, and densify the aluminum phosphate particles.

If desired, the sol material can be dried at about 100° C. to evaporate water and collapse the mass, and the collapsed powder can be washed with water to remove ammonium nitrate, $NH_4NO_3$, to thereby recover instead of thermally decompose the by-product. The washed and dried mass can be heat treated above about 215° C. to thermally decompose any residual ammonium nitrate, $NH_4NO_3$, thereby providing substantially pure amorphous aluminum phosphate, free of residual soluble salts.

The basic chemistry of the sol gel process is presented below as follows:

1. Precursor solution—Combination of all ingredients

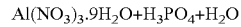

2. Gelling Agent

3. Sol-gel reaction

Reaction to form amorphous aluminum phosphate sol gel: as $NH_4OH$ (28% $NH_3$ in water) is added, it neutralizes the acid system and drives formation of insoluble $AlPO_4$, that takes $Al^{+3}$ out of the reaction and allows more $NH_4^{+1}$ to combine with $NO_3^{-1}$ to form soluble $NH_4NO_3$. Depending on the concentration and rate of addition of the $NH_4OH$ colloidal particles of $AlPO_4$ will form. Adding more $NH_3$ to the reaction allows the $AlPO_4$ colloidal particles to aggregate and to eventually form bonds between the particles to form the gel structure. The amount of $NH_3$ added must exceed the stoichiometric amount required to form $NH_4NO_3$ in order to have sufficient $NH_3$ to control pH and facilitate gel bridging. Depending on the amount of $NH_3$ added, the rate of addition, and the concentration, the gel will consist of a mass of $AlPO_4$ solid particles linked forming a cage, three-dimensional structure encapsulating ammonium nitrate, $NH_4NO_3$, dissolved in water. Ammonium phosphate may also be present as an intermediate, and extending reaction conditions (i.e., by further heating) will lead to full reaction with the aluminum in the system to condense to aluminum phosphate.

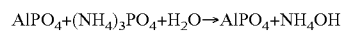

4. Filtration and washing—Optional to supplement or replace thermal purification to remove soluble ammonium salts.

5. Dehydration and drying—Drying at above at least 100° C. to evaporate water and collapse the sol gel structure to form a densified solid.

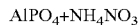

6. Thermal purification—Thermal treatment at 215 to 250° C. to thermally decompose ammonium nitrate.

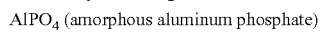

If desired, the order of ingredient addition can be changed from that disclosed above. For example, the acid solution may be added to a solution of the ammonium hydroxide in order to control the viscosity of the reaction system and/or impact the surface area of the colloidal solids. Such flexibility in the order of ingredient addition may be advantageous, e.g., for the scale-up of manufacturing where it may be desirable to avoid gelation in favor of the formation of a suspension of colloidal primary particles. The resulting composition after washing, drying and/or thermal treatment is essentially chemically the same regardless of the order of addition. However product morphology is affected by these processing parameters. Adding acid to base results in higher surface area and greater porosity. The sol gel process disclosed herein produces an aluminum phosphate composition consisting essentially of amorphous aluminum phosphate.

Base-to-acid sequencing causes rapid pH change and the rapid formation of sol particles followed by rapid gelation to form interlinked particles in the gel matrix. This reduces molecular mobility and prevents any further particle growth or morphological change. When acid is added to base, the pH change is slower and localized colloidal aluminum phosphate particles form. No gelation occurs so the system mobility allows for continued competing side reactions (increased solublization of ammonium nitrate and ammonium phosphate) allowing intermediate species to survive. When dehydration and thermal decomposition occur, small particles of aluminum phosphate exist in the presence of departing water and decomposition products (of ammonium nitrate), leading to more porosity in small aggregated aluminum phosphate particles.

As noted above, amorphous aluminum phosphate prepared by such sol gel process is substantially free of alkali metals and other unwanted solubles, and provides a desired controlled release of passivating phosphate anion, thereby greatly minimizing or eliminating the unwanted formation of film blistering and providing enhanced corrosion control both underfilm and at scribes in the film when compared to precipitated aluminum phosphates.

The sol gel process disclosed above is provided as an example embodiment, and it is to be understood variations of preparation other than those specifically disclosed may be used. The following sol gel preparation example is provided as reference.

The sol-gel process described herein produces amorphous aluminum phosphate pigments having surface areas (between about 100 and 150 m²/g BET) and very narrow particle size distributions compared to pigments produced by other synthesis routes such as precipitation, which gives surface areas as low as 3 up to, typically, 30 m²/g BET. This feature is highly desirable for an inhibitive pigment because the phosphate release reaction is surface area dependent and the smaller, narrow particle sizes distribution ensure uniform dispersion throughout the film formed from the composition.

Example No. 1

In an example embodiment, amorphous aluminum phosphate having the above-noted engineered properties is prepared by sol gel process based on using approximately 100 grams of process material. Approximately 567.5 grams of aluminum nitrate and approximately 174.4 grams phosphoric acid (85 weight percent) were dissolved in amounts of water noted below with mechanical stirring that does not introduce high shear. 1000 milliliters of ammonium hydroxide (28 to 30 percent by weight NH₃) was added into the stirred solution. The solution was stirred for 1 hour at room temperature before being processed for post heat treatment. The P:Al ratio was fixed at 1.0. Different samples were made using the same parameters but with different amounts of solvent water (250 grams, 500 grams, and 2,000 grams). Additionally, different samples were made using the same parameters but with different rates of ammonium hydroxide addition (10 mL/min. 100 mL/min, and 1,000 mL/min).

The following samples produced an amorphous aluminum phosphate sol gel; 250 grams solvent water at 100 and 1,000 mL/min ammonium hydroxide; and 500 grams solvent water at 1,000 mL/min ammonium hydroxide, and 2,000 grams solvent water at 100 and 1,000 mL/min ammonium hydroxide. Some of the so-formed sol gel samples were thermally treated at 100° C. for 24 hours before being heated to 250° C. for up to 2 to 3 days. Some of the so-formed samples were filtered, and the filter cake was washed with water. The washed sample was thermally treated at 100° C. for 24 hours. The amorphous aluminum phosphate prepared according to this example was alkali-metal free, was substantially free of solubles (having a soluble content as disclosed above), and displaced the desired controlled release rate of phosphate anion (as disclosed above).

It was discovered that post-treatment (washing versus heating only to 250° C.) has a controlling effect on the composition and structure of the amorphous aluminum phosphate formed. Heated samples (heated to 250° C.) give eluent having P:Al molar ratios close to 1.0 when they are eluted with water and are moderately acidic (around pH 3) indicating that the bulk material is essentially pure aluminum phosphate. Washed-only samples release more phosphate and less aluminum than the heated samples and are moderately basic in water (pH around 8). This indicates that the washed only samples have ammonium phosphate remaining in the bulk as either free or complexed with the aluminum phosphate.

Surface area of the solid is dependent on post-treatment, i.e., washing versus heating. The BET surface area of the heated (heated to 250° C.) solid is typically around 120 to 140 m²/g, whereas the sample composition washed-only as described above will have a surface area of 80 to 90 m²/g. It was discovered that washing changes the stability of the particles in the colloidal dispersion. Typically, ionic charges stabilize in the sol-gel structure to prevent agglomeration (which maintains small particle size and therefore high surface area). However, washing removes the ions thereby allowing agglomeration.

It was also discovered that the pH during the sol-gel reaction (i.e., amount of ammonia present) will affect the nature of the particles formed. Reaction and gel formation proceed at roughly the same rate. However, particles formed using low ammonium hydroxide ratios are smaller and more easily dispersed in water after each wash. This results in a lower aluminum phosphate yield. The reaction changes from base catalyzed to acid catalyzed when the ammonium hydroxide ratio is below 1.5×. This leads to an "open" network structure which further hydrolyzes and condenses. The acid catalyzed reaction produces "finer" particles that are less linked.

A base catalyzed reaction creates a stable transition state that fully hydrolyzes before condensation, leading to highly cross-linked particles that link to form gels with large pores between interconnected particles. During the synthesis process, it was found that a solid with the lowest phosphate release is formed when the maximum amount of water is used in the reaction system and the acid addition time to the base is the shortest.

A feature of amorphous aluminum phosphate prepared by sol gel process as described herein is that it produces nanosized colloidal particles that are spherical when aggregated and having a uniform particle distribution. Specifically, amorphous aluminum phosphate formed in this manner has an average primary particle size in the range of from about 5 to 100 nanometers, preferably in the range of from about 25 to 75 nanometers, and more preferably in the range of from about 40 to 50 nanometers. Amorphous aluminum phosphate particles sized less than about 5 nanometers may interfere with the processing of coating formulations and adversely affect film properties by increasing binder resin absorption.

Enhanced control over the essential characteristics of amorphous aluminum phosphate is achieved by manipulating the amount, concentration, rate of addition, and/or order of addition of the pH controlling agent, e.g., the ammonium hydroxide, which operates to adjust and fine tune sol formation and gelation, thereby promoting the formation of an amorphous aluminum phosphate capable of providing a desired controlled delivery of passivating anion. Additionally, the method of making as noted above provides an inherent process of controlling unwanted solubles content, as there are no alkali metals produced and the presence of other solubles can be removed during washing and/or thermal treatment, thereby promoting formation of a coating composition having a desired film stability and integrity.

Amorphous aluminum phosphates prepared as noted above are preferably not subjected to high-temperature treatment (above about 300° C.) for the purpose of retaining the amorphous structure and avoiding conversion to a crystalline structure. It has been discovered that amorphous aluminum phosphates formed in this manner retain the desired amorphous structure, even after the above-disclosed drying and thermal treatment, and this structure provides a distinct benefit/feature for use as a corrosion inhibiting pigment.

Such amorphous aluminum phosphates display a markedly increased water adsorption potential or degree of rehydration when compared to crystalline aluminum phosphates, that permit such amorphous aluminum phosphates, once dehydrated by drying, to be rehydrated to contain up to about 25 percent by weight water. This feature is especially useful when the amorphous aluminum phosphate is used with anticorrosion coating compositions, especially those comprising a non-aqueous composition. In such coating compositions the amorphous aluminum phosphate acts, in addition to being a corrosion inhibiting pigment, as a moisture scavenger to both slow water intrusion into the cured film and restrict water diffusion through the cured film. Thus, this water adsorption feature operates to provide another moisture barrier mechanism of corrosion control. The benefit of this effect has been demonstrated by the use of electroimpedence spectroscopy (EIS).

Anticorrosion coating compositions are prepared by combining a selected binding polymer with the amorphous aluminum phosphate in the amounts described above. The amorphous aluminum phosphate can be provided for composition formulation in the form of a dried powder or can be provided in the form of a slurry or liquid suspension depending on the formulation conditions or preferences.

Table 1 presents an example anticorrosion coating composition formulation in the form of an epoxy-polyamide primer composition prepared in the manner disclosed herein for purposes of reference.

TABLE 1

Example Epoxy-Based Anticorrosion Coating Composition

Solvent Based two parts Epoxy Primer Formula

Part 1

| | |
|---|---|
| Epoxy resin | 238.1 bs |
| Additive | 3 lbs |
| Pigment dispersant | 5 lbs |
| Solvent 1 | 75 lbs |
| Solvent 2 | 20.4 lbs |
| Anti-settling additive | 10.2 lbs |
| Red iron oxide pigment | 120.4 lbs |
| Anticorrosive pigment | 150 lbs |
| Extender pigment 1 | 341.3 lbs |
| Extender pigment 2 | 120.3 lbs |
| Extender pigment 3 | 78.5 lbs |
| Disperse high speed to Hegman 5-6 | |
| Epoxy resin | 24.8 lbs |
| Solvent | 96.3 lbs |

Part 2

| | |
|---|---|
| Curing agent | 142.2 lbs |

In this example, the first epoxy resin is a liquid epoxy resin based on the di-glycidyl ether or bis-phenol A such as EPON 828 (Hexion Chemical), the additive is an polymer that facilitates flow-out in film formation (Cytec), the pigment dispersant is an additive such as Anti-terra U (BykChemie), solvent 1 is an aromatic solvent such as toluene or xylene, solvent 2 is glycol ether, the anti-settling additive is a thixatrope such as Bentone SD, the prime color pigment is red iron oxide, the anticorrosive pigment is the amorphous aluminum phosphate prepared by the method of making disclosed above and is provided in the form of a dried powder, extender pigment 1 is barium sulphate, extender pigment 2 is magnesium silicate, extender pigment 3 is mica, the second epoxy resin is the same as the first addition, the third solvent is xylene, and the curing agent is polyamide resin such as EPIKURE 3175 (Hexion). The loading of the amorphous aluminum phosphate was approximately 10 percent by weight based on the total weight of the composition. Additionally, variations of this example formulation are prepared at amorphous aluminum phosphate loading levels of 5 and 15 weight percent.

The epoxy-based example samples were studied using electro-impedance spectroscopy (EIS). An unexpected result from the EIS testing was the observation that the incorporation of up to 15% by weight amorphous aluminum phosphate in epoxy-based samples demonstrated increased impedance in the epoxy film by up to an order of magnitude compared to control. This result indicates that the amorphous aluminum phosphate in these samples is enhancing the barrier properties of the epoxy by acting as a water scavenger, removing diffusing water from the matrix.

As water penetrates into the film, it is attracted to and accumulated at the amorphous aluminum phosphate particles present in the film. The water is preferentially adsorbed by the amorphous aluminum phosphate and only after local particle saturation has occurred will any water proceed beyond that location in the film. When this occurs, the next layer of amorphous aluminum phosphate will adsorb the water. This significantly slows the diffusion of water through the film and thereby increases the service life of the film. Further, the presence of water around the re-hydrated, saturated amorphous aluminum phosphate particles results in the release of phosphate anion into the migrating water. Hence, even if the service life is sufficiently long to allow diffusion of water through the film to the substrate, the aqueous solution reaching the substrate will contain passivating phosphate anion thereby preventing corrosion of the steel substrate.

Further, the ability of the amorphous aluminum phosphate to release inhibiting quantities of phosphate anion provides corrosion inhibition at the sites of physical defects or damage in the film.

This discovery of the unique combination of passivation, water adsorption, and nano-particle size and narrow/substantially uniform particle size distribution allows the practical incorporation of amorphous aluminum phosphate as a barrier enhancer in mid-coats and topcoats not simply in primers. Conventional inhibitive pigments have value only in primers because they provide only a passivation mechanism of corrosion control. Amorphous aluminum phosphate and coating compositions comprising the same according to this invention protects from corrosion by a dual mechanism: water adsorption enhancing barrier properties and release of passivating anion.

Table 2 presents an example anticorrosion coating composition formulation in the form of an acrylic latex primer composition prepared in the manner disclosed herein for purposes of reference.

TABLE 2

Example Acrylic Latex Based Anticorrosion Coating Composition

Water-based Primer Formula

| | |
|---|---|
| Water | 111 lbs |
| Pigment dispersant - Surfynol CT-131 | 23.4 lbs |
| TiO2 color pigment | 104.4 lbs |
| Ammonium hydroxide 25% | 1.6 lbs |
| Corrosion Inhibitive Pigment | 50 lbs |
| Extender Pigment - calcium carbonate | 183.7 lbs |
| Disperse under high sheer 30 minutes | |
| Then mix in the following | |
| Defoamer - Drewplus L-475 | 1.1 lbs |
| Coalescent - I Eastman EB | 49.2 lbs |
| Latex resin - Aquamac 740 | 506 lbs |
| Coalescent II - Texanol ester alcohol | 9 lbs |
| Coalescent III - Dowanol DPnB | 14 lbs |
| Dispersant/surfactant - Surfynol DF 210 | 2.4 lbs |
| Additive | 12.3 lbs |
| Plasticizer - Santicizer 160 | 12.3 lbs |
| Flash Rust Inhibitor- ammonium benzoate | 3 lbs |
| HASE Thickener - Acrysol TT 615 | 4.06 lbs |
| Defoamer | 1.4 lbs |

In this example, the pigment dispersant is Surfynol CT-131, the corrosion inhibitive pigment is amorphous aluminum phosphate prepared by the methods disclosed above and is provided in the form of powder, the defoamer is Drewplus L-475, coalescent 1 is Eastman EB, coalescent 2 is Dowanol DPnB, coalescent 3 is Texanol ester alcohol, the dispersant/surfactant is Surfynol DF 210, the plasticizer is Santicizer 160, the flash rust inhibitor is ammonium benzoate salt, the HASE thickener is Acrysol TT 615. The loading of the amorphous aluminum phosphate in this formulation was approximately 4.6 percent by weight based on the total weight of the composition.

As demonstrated above, embodiments of the invention provide a novel anticorrosion coating composition comprising amorphous aluminum phosphate. While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein.

For example, if desired, anticorrosion coating compositions can be prepared comprising one or more elements known to have anticorrosive value in addition to the amorphous aluminum phosphate, e.g., cations such as zinc, calcium, strontium, chromate, borate, barium, magnesium, molybdenum and combinations thereof. The addition of such other element(s) can operate to increase or complement the anticorrosive effect of the coating composition.

Additionally, while anticorrosion coating compositions as described herein are engineered to include aluminum phosphate in an amorphous form, it is to be understood that anticorrosion compositions as described herein can comprise aluminum phosphate in its known crystalline forms. For example, such crystalline aluminum phosphate can be present in amounts that do not otherwise adversely impact or impair the engineered anticorrosion mechanisms and/or properties of the coating composition.

In other embodiments, the compositions or methods do not include, or are substantially free of, any compounds or steps not enumerated herein. Variations and modifications from the described embodiments exist. The method of making the coating compositions and/or amorphous aluminum phosphate is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A method for making an anticorrosive coating composition comprising an amorphous aluminum phosphate corrosion inhibiting pigment dispersed therein comprising the steps of:
    making an amorphous aluminum phosphate corrosion inhibiting pigment by sol gel process comprising:
        combining an aluminum salt with phosphoric acid in an aqueous solution to form a mixture;
        combining a sufficient amount of base material together with the mixture to increase the pH of the mixture to form a sol comprising a dispersion of colloidal amorphous aluminum phosphate particles in a liquid;
        combining a further amount of the base material with the sol to cause the colloidal particles to aggregate and form a gel structure, wherein the gel comprises a three-dimensional structure of linked-together colloidal amorphous aluminum phosphate particles that encloses the liquid; and
        treating the gel to collapse the three-dimensional structure and remove the liquid to provide solid amorphous aluminum phosphate particles
    combining the solid amorphous aluminum phosphate particles with a binding polymer to form the anticorrosive coating composition.

2. The method as recited in claim 1 wherein the aluminum salt is aluminum nitrate, and further comprising the step of forming ammonium nitrate during one or both of the steps of adding.

3. The method as recited in claim 1 wherein the base material is ammonium hydroxide.

4. The method as recited in claim 3 wherein the total amount ammonium hydroxide used to form the sol and the gel is from about 1 to 3 times a stoichiometric amount to form ammonium nitrate.

5. The method as recited in claim 1 wherein during the step of combining a sufficient amount of base material together with the mixture, the base material is added to the mixture.

6. The method as recited in claim 1 wherein the colloidal particles have an average particle size of from about 1 to 100 nanometers.

7. The method as recited in claim 6 wherein the colloidal particles are substantially spherical in shape and have a substantially uniform particle size distribution.

8. The method as recited in claim 1 wherein about 50 percent of the aggregated colloidal particles are sized from about 1 to 5 microns, and wherein about 90 percent of the aggregated colloidal particles are sized from about 0.5 to 10 microns.

9. The method as recited in claim 1 wherein before the step of treating, forming ammonium phosphate.

10. The method as recited in claim 9 wherein the coating composition comprises up to about 1,000 ppm ammonium phosphate.

11. The method as recited in claim 1 wherein the coating composition comprises a controlled delivery of 1500 ppm or less phosphate anion when the coating is applied onto a metal substrate and in the presence of moisture.

12. The method as recited in claim 1 wherein the coating composition comprises a controlled delivery of 500 ppm or less phosphate anion when the coating is applied onto a metal substrate and in the presence of moisture.

13. The method as recited in claim 1 wherein the coating composition comprises a controlled delivery of 50 to 200 ppm or less phosphate anion when the coating is applied onto a metal substrate and in the presence of moisture.

14. The method as recited in claim 1 wherein before the step of combining with the binding polymer, washing the amorphous aluminum phosphate.

15. The method as recited in claim 1 wherein the step of treating comprises heating the gel to a temperature of up to about 300° C.

16. The method as recited in claim 15 wherein the gel is heated to a temperature from about 100 to 200° C.

17. The method as recited in claim 1 wherein before the step of combining with the binding polymer, the gel is alkali-metal free.

18. The method as recited in claim 1 wherein the step of treating comprises heating the gel at a sufficient temperature for a time sufficient to evaporate water, collapse the three dimensional structure, and thermally decompose any ammonium nitrate, wherein the solid amorphous aluminum phosphate is both alkali-metal free and free of by-products of the reaction.

19. The method as recited in claim 1 wherein during the step of mixing, the binding polymer is selected from the group consisting of polyurethanes, polyesters, solvent-based epoxies, solventless epoxies, water-borne epoxies, epoxy copolymers, acrylics, acrylic copolymers, silicones, silicone copolymers, polysiloxanes, polysiloxane copolymers, alkyds and combinations thereof.

20. The method as recited in claim 1 wherein the binding polymer is selected from the group consisting of epoxy, acrylic latex, and acrylic copolymer latex.

21. The method as recited in claim 1 wherein the coating composition additionally comprises a material including an element selected from the group consisting of zinc, calcium, strontium, chromate, borate, barium, magnesium, molybdenum and combinations thereof.

22. A method for making an anticorrosion coating composition comprising the steps of:
  making amorphous aluminum phosphate by sol gel process comprising:
    combining an aluminum salt with phosphoric acid in an aqueous solution to form a mixture;
    adding ammonium hydroxide to the mixture to form a sol comprising a dispersion of colloidal amorphous aluminum phosphate particles in liquid, the particles having a substantially spherical shape;
    adding further ammonium hydroxide to the sol to cause the colloidal particles to aggregate and form a gel having a three-dimensional structure of linked amorphous aluminum phosphate particles enclosing the liquid; and
    heating the gel at a temperature less than about 300° C. to produce dried amorphous aluminum phosphate particles; and
  combining the dried amorphous aluminum phosphate particles with a binding polymer to form an anticorrosion coating composition.

23. The method as recited in claim 22 wherein the step of heating takes place at a temperature between about 100 to 200° C.

24. The method as recited in claim 23 wherein the coating composition comprises ammonium phosphate.

25. The method as recited in claim 24 wherein the coating composition has a controlled phosphate anion release of between 200 to 1,500 ppm.

26. The method as recited in claim 22 wherein the step of heating takes place at between about 200 to 250° C.

27. The method as recited in claim 26 wherein after the step of heating, the dried amorphous aluminum phosphate is substantially free of ammonium nitrate and is alkali metal free.

28. The method as recited in claim 26 wherein the coating composition has a controlled phosphate anion release of between 50 to 500 ppm.

29. The method as recited in claim 22 further comprising washing the amorphous aluminum phosphate particles to reduce the content of soluble by-products of the reaction.

30. The method as recited in claim 22 wherein the binding polymer is selected from the group consisting of polyurethanes, polyesters, solvent-based epoxies, solventless epoxies, water-borne epoxies, epoxy copolymers, acrylics, acrylic copolymers, silicones, silicone copolymers, polysiloxanes, polysiloxane copolymers, alkyds and combinations thereof.

31. The method as recited in claim 22 wherein the binding polymer is selected from the group consisting of epoxy, acrylic latex, and acrylic copolymer latex.

32. The method as recited in claim 22 wherein the coating composition additionally comprises a material including an element selected from the group consisting of zinc, calcium, strontium, chromate, borate, barium, magnesium, molybdenum and combinations thereof.

33. A method for making an anticorrosion coating composition comprising the steps of:
  making amorphous aluminum phosphate by sol gel process comprising:
    combining aluminum nitrate with phosphoric acid to form a mixture and combining therewith ammonium hydroxide to form a sol comprising a dispersion of amorphous aluminum phosphate primary colloidal particles in a liquid, the colloidal particles having an average size of 1 to 100 nanometers and being substantially spherical in shape, and aggregating the colloidal particles with one another to form a gel having a three-dimensional network of the aggregated colloidal particles enclosing the liquid; and heating the gel at a temperature less than about 300° C. to produce dried amorphous aluminum phosphate particles; and combining the dried amorphous aluminum phosphate particles with a binding polymer to form an anticorrosion coating composition, wherein the coating composition has a controlled phosphate anion release of 100 to 1,500 ppm.

34. The method as recited in claim 33 wherein the step of heating takes place at between 100 to 200° C., and wherein the coating composition comprises ammonium phosphate and the controlled release of phosphate anion is greater than 200 ppm.

35. The method as recited in claim 33 wherein before the step of heating, washing the gel.

36. The method as recited in claim 33 wherein the step of heating takes place at between 200 to 300° C., and wherein the coating composition is substantially free of ammonium phosphate and the controlled release of phosphate anion is less than about 500 ppm.

37. The method as recited in claim 33 wherein the aggregated colloidal particles are substantially spherical in shape.

38. The method as recited in claim 33 wherein the binding polymer is selected from the group consisting of polyurethanes, polyesters, solvent-based epoxies, solventless epoxies, water-borne epoxies, epoxy copolymers, acrylics, acrylic copolymers, silicones, silicone copolymers, polysiloxanes, polysiloxane copolymers, alkyds and combinations thereof.

39. The method as recited in claim 33 wherein the binding polymer is selected from the group consisting of epoxy, acrylic latex, and acrylic copolymer latex.

40. The method as recited in claim 28 wherein the coating composition additionally comprises a material including an element selected from the group consisting of zinc, calcium, strontium, chromate, borate, barium, magnesium, molybdenum and combinations thereof.

* * * * *